United States Patent [19]

Cayen et al.

[11] 4,303,360
[45] Dec. 1, 1981

[54] POWER DRAWFINGER SYSTEM FOR MACHINE TOOL SPINDLE

[75] Inventors: Donald J. Cayen; John T. Janeczko, both of Fond du Lac, Wis.

[73] Assignee: Giddings & Lewis, Inc., Fond du Lac, Wis.

[21] Appl. No.: 125,860

[22] Filed: Feb. 29, 1980

[51] Int. Cl.³ .......................... B23B 5/26; B23B 31/10
[52] U.S. Cl. .................................... 409/233; 409/134; 408/239 A
[58] Field of Search .............................. 409/233, 134; 408/239 R, 239 A

[56] References Cited

U.S. PATENT DOCUMENTS

| | | |
|---|---|---|
| 2,210,088 | 8/1940 | Longfield . |
| 3,461,752 | 8/1969 | Kielas et al. . |
| 3,466,952 | 9/1969 | Greenberg et al. . |
| 3,533,316 | 10/1970 | Porath . |
| 3,620,586 | 11/1971 | Maastricht . |
| 3,649,051 | 3/1972 | Jones et al. . |
| 3,975,984 | 8/1976 | Simmons ............................ 409/233 |
| 4,063,488 | 12/1977 | Kagerer ............................. 409/233 |
| 4,122,755 | 12/1978 | Johnson et al. ..................... 409/233 |
| 4,131,054 | 12/1978 | Johnson et al. ..................... 409/233 |

FOREIGN PATENT DOCUMENTS 562657  7/1944  United Kingdom .

Primary Examiner—Harrison L. Hinson
Attorney, Agent, or Firm—Leydig, Voit, Osann, Mayer & Holt, Ltd.

[57] ABSTRACT

A power drawfinger system for selectively locking and releasing a toolholder or arbor in the socket of a power driven machine tool spindle. The system includes a collet device actuated by a power drawbolt using hydraulic means for expanding said device and a resilient member for contracting same to disengage or engage the toolholder. The collet device and drawbar mechanisms are constructed to be fail safe in event of breakage of the collet or loss of power.

10 Claims, 7 Drawing Figures

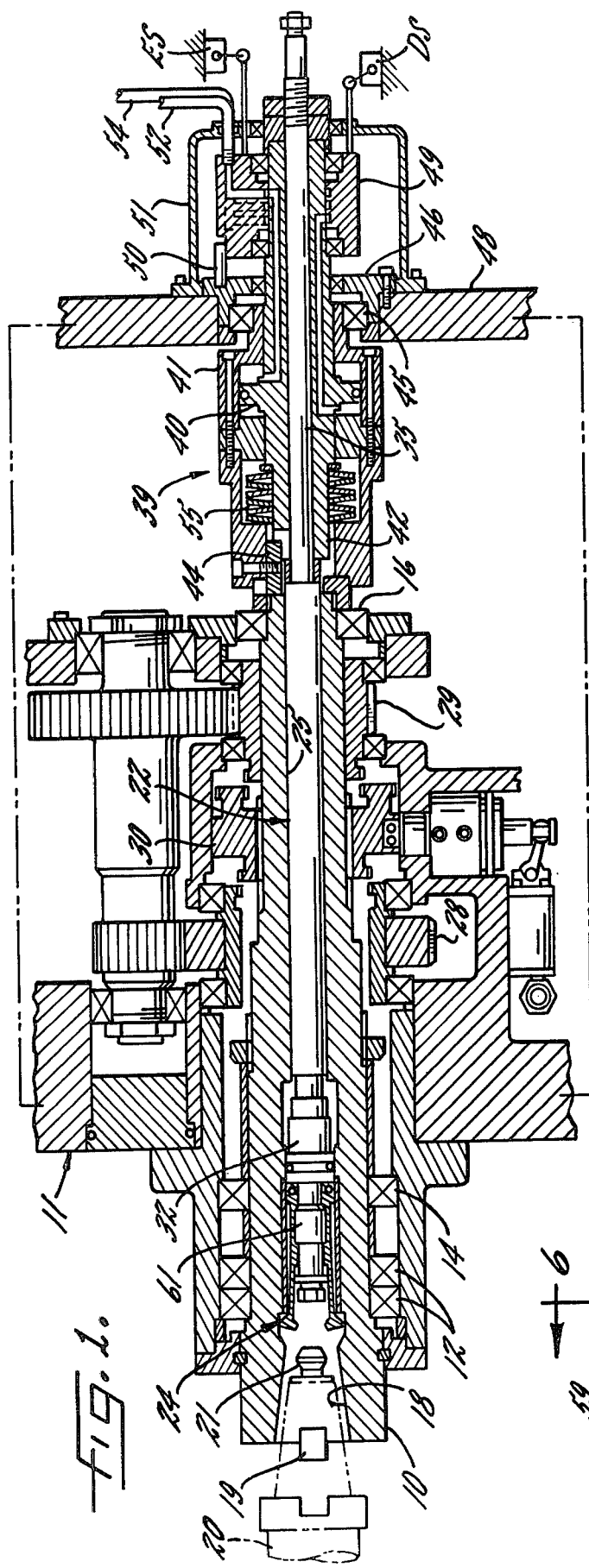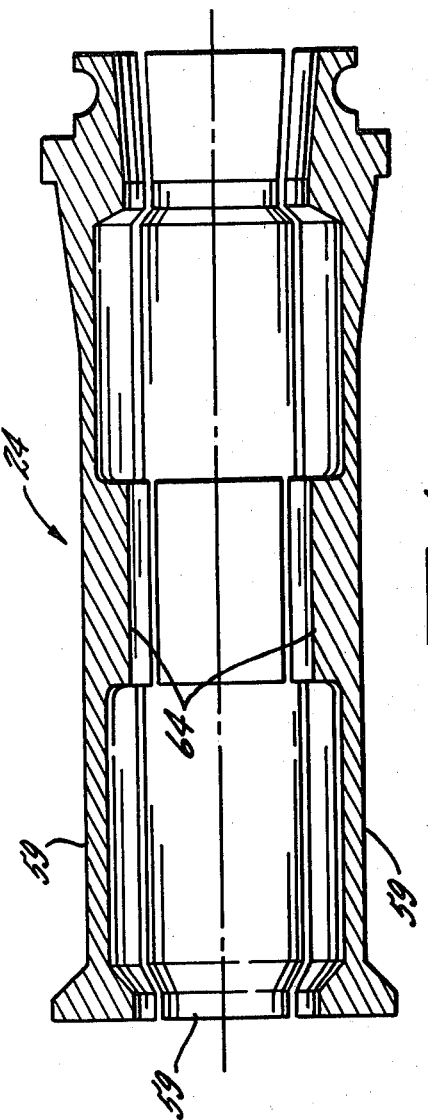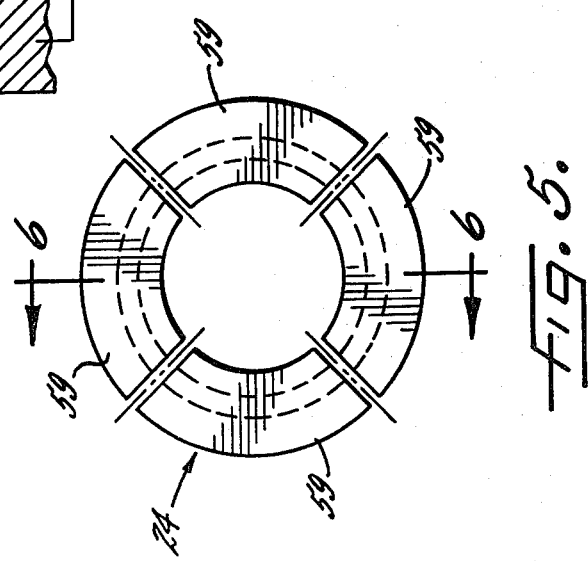

POWER DRAWFINGER SYSTEM FOR MACHINE TOOL SPINDLE

DESCRIPTION OF THE INVENTION

The present invention relates in general to the field of machine tools and, more specifically, to a power drawfinger system for a machine tool spindle. The invention finds particular, but not exclusive, utility in fully automated machines such as numerically controlled multifunction machine tools known as machining centers. The latter may utilize either a fixed spindle or a live spindle.

A wide variety of mechanisms has evolved heretofore for the purpose of selectively locking and releasing a toolholder or arbor in the socket of a power driven machine tool spindle. Such mechanisms generally include some type of power drawbolt together with an appropriate means for connecting and disconnecting the drawbolt with the tool holder in the spindle socket. These prior devices exemplified in the following U.S. patents frequently employ various collet devices adapted to expand and contract to disengage or engage the toolholder with respect to the spindle socket:

| U.S. Pat. No. | Patentee | U.S. Pat. No. | Patentee |
| --- | --- | --- | --- |
| Re. 26,623 | Erikson | 3,709,623 | Stephan et al. |
| 2,835,227 | Gamet | 3,868,886 | Bondie |
| 2,860,547 | Stephan | 3,875,848 | Powell |
| 3,023,675 | Stephan | 4,026,191 | Blomquist |
| 3,177,775 | Alisauskis | 4,075,927 | Frazier |
| 3,474,705 | Jacob | 4,102,035 | Voglrieder et al. |
| 3,568,566 | Weidig | 4,131,054 | Johnson et al. |
| 3,651,739 | Wolf | 4,148,246 | Johnson et al. |

The duty cycle on a collet type connecting device is extremely severe. In normal usage of the machine tool, the collet device is expanded and contracted for every tool change resulting in repeated applications of extremely high stresses interposed with periods of sudden relief. Because of the space constraints imposed by the limited diameter of the spindle bore which houses the drawbolt and the collet device, it is difficult to include sufficient stock in the latter to preclude the possibility of breakage under stress during its normal life. If and when breakage occurs, it becomes essential to stop the spindle immediately to avoid injury to personnel or damage to a workpiece from sudden release of the toolholder and its cutting tool.

With the foregoing in mind, the general aim of the present invention is to provide a power drawfinger system adapted for use in a power driven machine tool spindle and which will be fail-safe in construction and operation.

A more specific object of the invention is to provide a drawfinger system of the foregoing type wherein the power drawbolt will still maintain control of the toolholder and its cutting tool in the event that the collet device should fail under stress. A related object is to include in the system means for stopping the spindle when failure of the collet device occurs.

Still another object of the invention is to provide a power drawfinger system wherein provision is made for precisely confining the area of potential failure of a collet device to a location which will enable the drawbolt to maintain control over the toolholder and cutting tool in event of failure.

A further object is to provide a power drawfinger system of the character set forth above capable of withstanding automated insertion of tooling into and removal of tooling from the spindle socket without incurring excessive wear or damage to the collet device, the drawbolt or the tooling.

Still another object is to provide a drawfinger mechanism of the foregoing character which will be of simple, rugged construction and afford ready access for maintenance.

Other objects and advantages of the invention will become apparent from the following detailed description, taken in connection with the accompanying drawings, wherein:

FIG. 1 is a vertical sectional view taken axially through the spindle and headstock of an illustrative machine tool exemplifying the present invention.

FIG. 5 is an enlarged front end view of the collet device drawn to the same scale as FIG. 4.

FIG. 6 is a vertical sectional view taken longitudinally through the collet device in the plane of the line 6—6.

Figure 2:
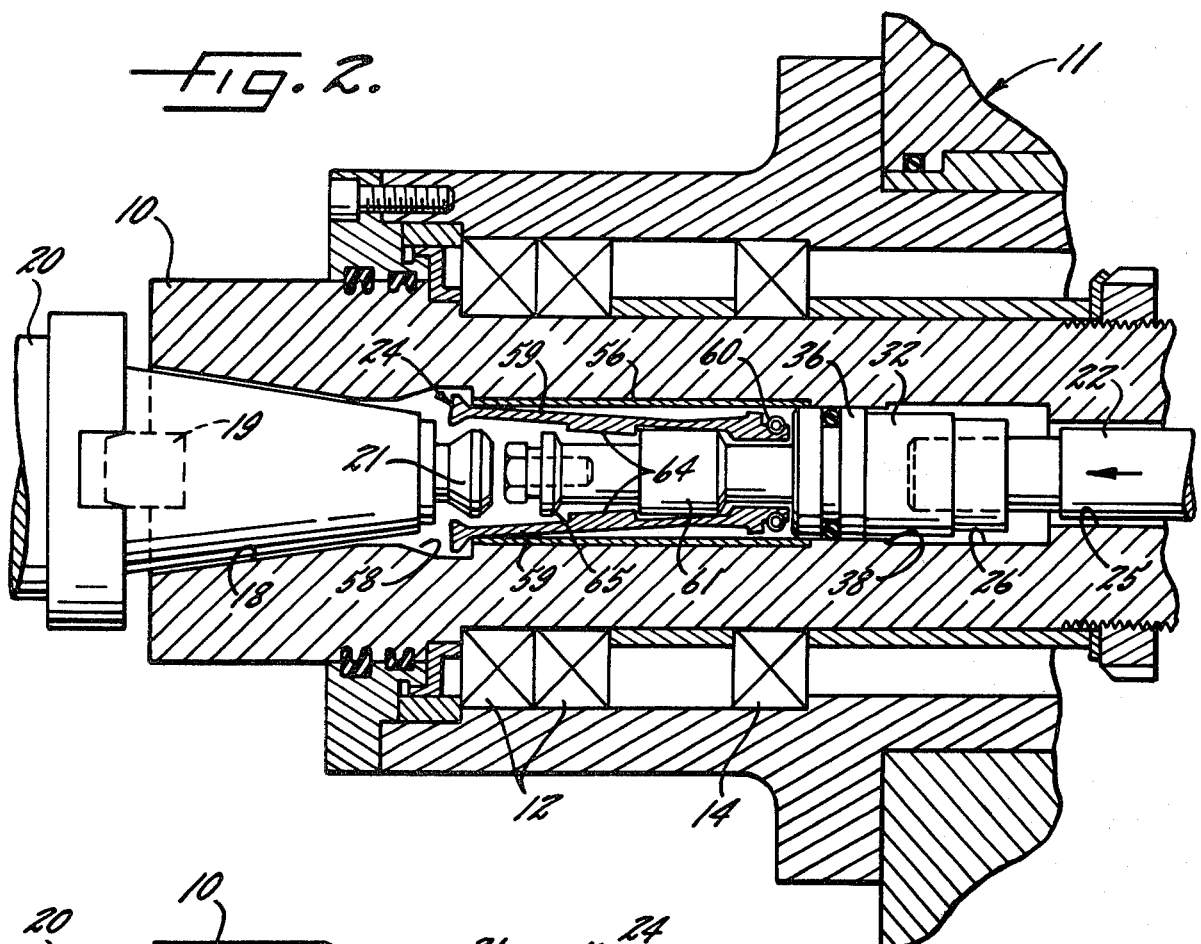
FIGS. 2 and 3 are enlarged, fragmentary vertical sectional views taken axially of the spindle and headstock and showing the connecting mechanism between the drawbolt and the toolholder in two different axial positions.

While the invention is susceptible of various modifications and alternative constructions, a certain illustrative embodiment has been shown in the drawings and will be described below in considerable detail. It should be understood, however, that there is no intention to limit the invention to the specific form disclosed but, on the contrary, the intention is to cover all modifications, alternative constructions, and equivalents falling within the scope of the appended claims.

Referring more specifically to FIG. 1, the invention is there exemplified in the power spindle 10 and headstock 11 of an automated machine tool which may be constructed in a number of different configurations. In the present instance, the spindle 10 happens to be of the horizontal, axially fixed type adapted to perform multiple function machining operations.

The spindle 10 is journaled for rotation in the headstock 11 upon axially spaced bearings 12, 14, 16. These bearings may be of the ball thrust type with appropriate provision for cooling by means of a circulating lubricant. At its forward or outboard end, the spindle 10 has the usual tapered socket 18 and one or more keys 19 for drivingly engaging the tapered shank and notched flange of a toolholder 20. The toolholder 20 is adapted to mount a cutting tool (not shown) at its outboard end and is provided with a gripping knob 21 at its tapered end to hold it snugly in the spindle socket 18. The toolholder is thus adapted to rotate in unison with the spindle when inserted into the spindle socket and the gripping knob has been engaged by the action of drawbar 22 and collet device 24. A long cylindrical bore 25 extends from the rearward end of the spindle forwardly for more than half its length. The bore 25 then connects with a counterbore 26 which, in turn, communicates with the spindle socket 18. The bore 25 and counterbore 26 slidably house the drawbar 22 and the collet device 24.

In the present case, the spindle is driven from an appropriate transmission alternately through first clutch gear 28 or second clutch gear 29, depending upon the position of axially slidable clutch member 30 which has a splined connection with the spindle. The clutch gears 28, 29 are disposed in surrounding relation with the spindle and journaled on suitable bearings in the headstock.

The system of the present invention (FIGS. 1-3) includes the drawbar 22, the actuating means for the drawbar, and the collet device 24 for releasably engaging the drawbar with the toolholder 20. The drawbar 22 comprises a drawbar head 32 at its forward end housed within the spindle counterbore 26; an intermediate portion 34 corresponding in length to the spindle bore 25 and having a slight diametral clearance with the bore 25; and an actuator section 35 of smaller diameter than the portion 34 extending through the rear wall of the headstock 11. The drawbar is mounted for limited movement axially of the spindle but rotates in unison with the spindle. The drawbar is centered by means of a boss 36 on the drawbar head which is piloted by an annular land 38 in the counterbore, and bearings associated with the actuating means at the rear of the headstock.

For the purpose of shifting the drawbar 22 axially to selectively engage or disengage the toolholder 20 with respect to the spindle socket 18, hydraulic actuator 39 is connected to the rearward end of the spindle. The actuator 39 comprises a hydraulic piston 40 adapted to reciprocate within a cylinder 41. The piston is unitary with a piston shaft 42 connected for rotation in unison with the spindle as by means of key 44. Adjacent its rearward end, the cylinder has a stepped down hub which surrounds the piston shaft. A support bearing 45 is interposed between that hub and a surrounding collar 46 fixed to the rear wall 48 of the headstock.

The piston shaft 42 extends rearwardly of the headstock rear wall and has mounted thereon a hydraulic slip ring unit 49. The latter has appropriate bearings journaling it for the relative rotation of the piston shaft. The unit 49 is held against rotation as by means of pin 50 fixed to the nonrotating collar 46 on the headstock wall. The hydraulic slip ring unit is housed within a suitable oil sealed enclosure 51 fixed to the headstock wall. The piston shaft 42 has hydraulic passages extending from the slip ring unit 49 and communicating respectively with the cylinder on each side of the piston 40. Hydraulic pressure fluid is supplied to the slip ring unit and drained therefrom as by means of conduits 52,54 (FIG. 1). The piston shaft 42 has a central bore which slidably houses actuator section 35 of the drawbar. As indicated earlier herein, the actuator section 35 is of somewhat smaller diameter than the spindle portion of the drawbar and extends somewhat beyond the slip ring unit for purposes of adjustment and control.

Operatively associated with the hydraulic piston 40 is a Belleville spring assembly 55 mounted on the piston shaft 42. The spring assembly is interposed between a collar fixed to the piston shaft and the forward wall of a recess in which the assembly is enclosed. The spring assembly is set so as to have a normal bias toward the rear of the headstock, or in a direction tending to maintain the drawbar 22 and collet device 24 in engagement with the gripper knob of the toolholder in the spindle socket.

Turning next to the counterbore 26 in the spindle, it has been noted above that the counterbore includes the annular land 38 which serves as a centering means for the sliding boss 36 of the drawbar head. Extending forwardly from the land 38 is a hardened liner sleeve 56 which forms a part of the collet device 24. Immediately adjacent the forward end of the liner, the counterbore has a laterally enlarged clearance recess 58 which tapers into a transition area merging with the tapered wall of the spindle socket 18.

The collet device 24 (FIGS. 2-6) comprises the liner sleeve 56 in the spindle and a split collet, comprising in this case four separate fingers 59, surrounded by the liner sleeve 56. The split collet when assembled is of generally cylindrical form, with tapered portions of somewhat larger diameter at each end. The rearward end of the collet has a peripheral groove which accommodates a circumferential retainer spring 60 (FIG. 4). The collet fingers are expanded and retracted through engagement by a large boss 61 on the drawbar head. To expand the collet fingers 59 for receiving the gripping knob of toolholder 20, or for ejecting the toolholder 20 from the socket 18, the boss 61 moves the collet fingers axially forward until their tapered end portions emerge from the liner sleeve 56 and are rocked outwardly under the pressure of the circumferential retaining spring 60 (FIG. 2). In the case of ejecting a toolholder, the drawbar head has an ejector abutment 62 which strikes the end of the gripper knob a hammer blow to break the toolholder loose.

Figure 3:
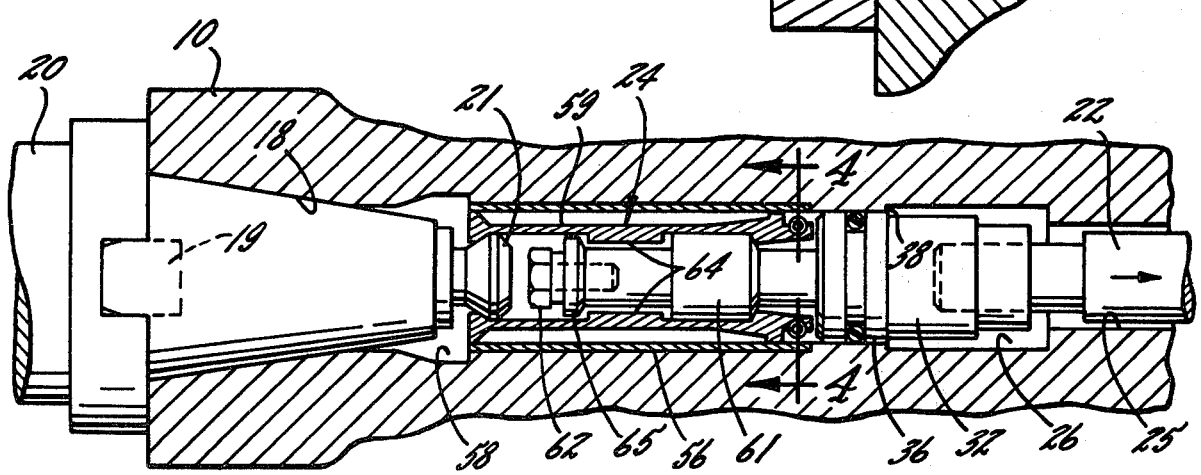
Figure 4:
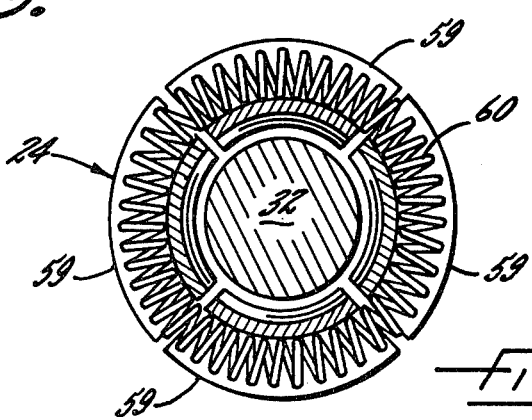
FIG. 4 is a further enlarged transverse sectional view through the drawbolt and inner end of the collet device, taken in the plane of the line 4—4 in FIG. 3.
Figure 7:
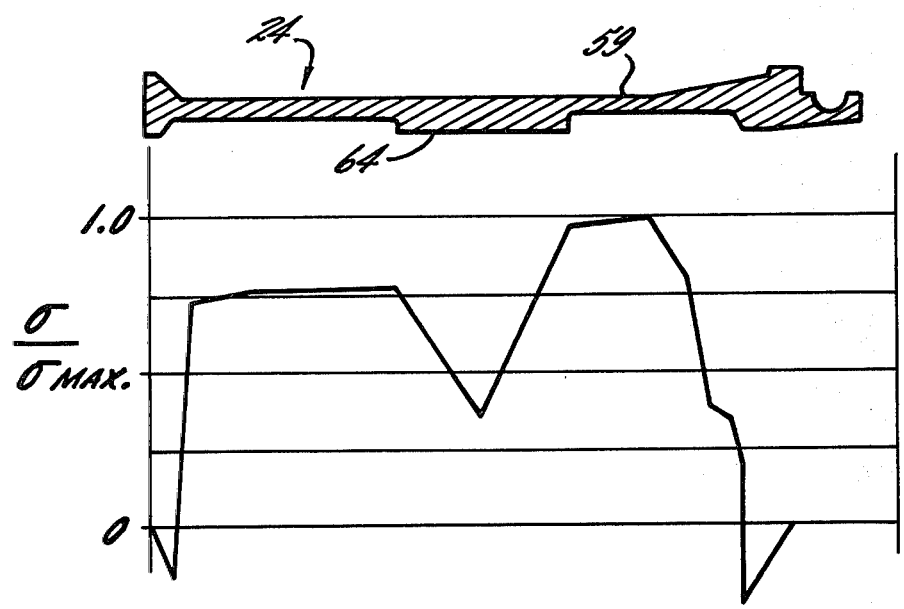
FIG. 7 is a normalized stress curve taken longitudinally through the side wall section of the collet device.

To retract the fingers 59 so as to engage the gripping knob of the toolholder 20, the boss 61 draws them back into the liner sleeve 56, their tapered outer end portions camming the fingers radially inwardly and overcoming the force of the retainer spring 60 (FIG. 3).

Provision is made in the power drawfinger system of the invention for enabling the power drawbar to maintain control of the toolholder and its cutting tool in the event that the collet device should fail under stress. This is accomplished by proportioning the collet device and the drawbar head in such manner that the area of potential failure will be precisely confined to a location which will enable the drawbar to maintain control over the toolholder and cutting tool.

In keeping with the above objective, the intermediate portion of each collet finger 59 is formed with a radially inward extending safety flange 64 which is substantially thicker than the other parts of the side wall. These safety flanges 64 are, of course, in axial alignment with each other and act as one with respect to the drawbar. In addition, the side wall of each finger is made substantially thicker between the safety flange and the outer end of the finger than the side wall between the safety flange and the inner end of the finger. Thus the area of thinnest cross section, and hence the area of greatest unit stress and potential failure, is located inboard of the safety flange.

To enable the drawbar to maintain control in event of failure of a collet with the safety flange 64, the drawbar head is fashioned with a preventer flange 65 spaced axially forward of the operating boss 61. The parts are so proportioned that the safety flange 64 of each collet finger fits between the operating boss 61 and the preventer flange 65.

Since by design, the location of a failure will be in the thin walled portion of each finger between the safety flange and the inner end of the finger, it follows that the preventer flange 65 will maintain engagement with the gripper knob and thereby prevent accidental release of the toolholder. The predictability of a failure in the thinnest part of the collet finger is borne out by a normalized stress curve taken longitudinally of a finger section. It will be noted that the very highest stress will occur at or about the point where the thinnest wall section begins to thicken up toward the inner end of the finger.

In order to facilitate the control and operation of the power drawfinger system of the present invention, two limit switches are mounted on the headstock frame in position to be actuated by predetermined axial movements of the drawbar. One such switch, labeled "ES", has two operating positions and will be referred to as the "engage" switch. The other, labeled "DS", has a single operating position and will be referred to as the "disengage" switch. The function of these switches will become more apparent in the course of a description of the tool ejection and tool engage cycles.

Taking up the tool ejection cycle first, it will be assumed that a toolholder 20 is engaged in the tapered socket 18 of the spindle. A solenoid valve (not shown) is operated to direct pressure fluid to the eject side of the actuator piston 40. At the same time the engage side of the of the piston 40 will be connected to drain. The piston and drawbar will then move 0.300" to the left, as viewed in FIGS. 1-3, compressing the disc spring assembly 55 to 5,000 lbs. force, and will push the collet fingers out of their liner sleeve allowing them to open. At this time, the ejector abutment on the front of the drawbar head will be in contact with the end of the toolholder gripping knob. The piston 40 and drawbar 22 will then move an additional 0.045" and push the toolholder out of the spindle socket. In this position, the piston 40 is against its stop inside the hydraulic cylinder 41, the spring assembly is compressed to 5,300 lbs. force and the disengage switch DS has been tripped. The rear mounted two-position limit switch ES has not been tripped, and the spindle can be operated under this condition.

Turning next to the tool engage cycle, it will be assumed that the system is in the same position as it was at the completion of the eject cycle. A toolholder is then placed in the spindle socket 18 and the solenoid valve is operated to relieve the fluid pressure on the eject side of the piston 40. This will cause the piston and drawbar to be pushed to the right by the spring assembly 55 and will pull the collet fingers into their liner sleeve, closing around the gripper knob of the toolholder. The toolholder 20 will be drawn into the spindle socket 18 by the force in the spring assembly of 3,000 lbs., and the drawbar travel will be 0.345". During this time, the hydraulic pressure is building up on the engage side of the piston 40 until it reaches its maximum value, creating an additional force of 5,000 to 8,000 lbs., depending upon the hydraulic pressure. The total force in the drawbar is then 8,000 to 11,000 lbs. At this time, the rear mounted limit switch ES is tripped at its first position. The spindle can be operated under this condition.

If no tool is placed in the spindle socket 18 on the engage cycle, the piston 40 and drawbar 22 will move to the right, as viewed in FIGS. 1-3, 0.345", plus 0.190" overtravel. The piston 40 will then abut a stop inside the hydraulic cylinder. Under this condition, the limit switch ES would be tripped in its second position, and the spindle could not be operated.

If the collet fingers were to fail in the engage cycle, the drawbar would move to the right 0.345" as viewed in FIGS. 1-3, plus 0.125" additional travel and the preventer flange 65 on the drawbar would engage the safety flange on the collet fingers, thereby holding the toolholder 20 in place in the spindle socket. In this condition, the limit switch ES would be tripped in its second position, and the spindle could not be operated. If the spindle were to be rotating at the time the collet fingers failed, the spindle would be stopped when the switch ES is tripped in its second position.

While the present invention is exemplified in the environment of a machine tool with a fixed spindle, the invention is just as readily applicable to a machine tool with a live spindle. In that case, the limit switches and other parts shown herein as mounted on the headstock would be mounted instead on the ram or ram guide of the live spindle machine.

We claim as our invention:

1. A power drawfinger system for releasably securing a tapered shank toolholder in the correspondingly tapered socket of a machine tool spindle, the toolholder having a gripping knob on its tapered end, said system comprising, in combination,
   (a) a headstock;
   (b) a spindle journaled within said headstock, said spindle having an axial bore therein;
   (c) a power drawbar slidably but non-rotatably mounted within said spindle;
   (d) an actuating shaft disposed in axial alignment with said spindle, said shaft being connected to said spindle for rotation in unison therewith;
   (e) means defining a counterbore adjacent the outer end of said spindle communicating with said spindle socket;
   (f) a guide boss on said drawbar;
   (g) an annular land on said drawbar spaced from said guide boss;
   (h) a preventer flange on said drawbar spaced from said annular land; and
   (i) a collet device comprising a plurality of individual fingers, each finger having an internal safety flange adapted to fit between said annular land and said preventer flange.

2. A power drawfinger system for releasably securing a tapered shank toolholder in the correspondingly tapered socket of a machine tool spindle, said system comprising, in combination,
   (a) a headstock;
   (b) a spindle journaled within said headstock, said spindle having an axial bore therein;
   (c) a power drawbar slidably but non-rotatably mounted within said spindle;
   (d) an actuating shaft disposed in axial alignment with said spindle, said shaft being connected to said spindle for rotation in unison therewith;
   (e) means defining a counterbore adjacent the outer end of said spindle communicating with said spindle socket;
   (f) a guide boss on said drawbar;
   (g) an annular land on said drawbar spaced from said guide boss;
   (h) a preventer flange on said drawbar spaced from said annular land; and
   (i) a collet device comprising a plurality of individual fingers, each finger having an internal safety flange adapted to fit between said annular land and said preventer flange, said collet device being adapted to grip the toolholder in response to axial movement of said drawbar.

3. In a power drawfinger system for selectively locking and releasing a toolholder in the socket of a power driven machine tool spindle, the combination comprising:
  (a) a gripping collet defined by a plurality of individual fingers;
  (b) cam means on one end of each said finger for actuating same;
  (c) biasing means on the other end of each said finger for urging same toward a disengage position;
  (d) an internal safety shoulder defined on said finger intermediate the ends thereof;
  (e) each said finger having a heavier wall section between said cam means and said safety shoulder than the wall section between said biasing means and said safety shoulder.

4. In a power drawfinger system for selectively locking and releasing a toolholder in the socket of a power driven machine tool spindle, the combination of:
  (a) a split collet having a forward end and a rearward end;
  (b) a safety shoulder on said collet intermediate the ends thereof; said collet having a thicker wall section between said safety shoulder and said forward end than between said safety shoulder and said rearward end;
  (c) drawbar means axially slidable within said spindle;
  (d) first means on said drawbar means adapted to engage said collet between said safety shoulder and said rearward end; and
  (e) second means on said drawbar means adapted to engage said collet between said safety shoulder and said forward end in event of breakage of said collet.

5. The combination set forth in claim 4 where said first collet engaging means on said drawbar is a boss.

6. The combination set forth in claim 4 wherein said second collet engaging means is a preventer flange.

7. The combination set forth in claim 2 including a safety switch adapted to preclude rotation of said spindle in response to axial overtravel movement of the drawbar resulting from engaging said drawbar in the absence of a toolholder in the spindle socket.

8. The combination set forth in claim 2 including a safety switch adapted to preclude rotation of said spindle in response to axial overtravel movement of the drawbar resulting from breakage of said collet fingers.

9. The combination set forth in claim 2 wherein said actuating shaft is connected to a hydraulic actuator and said actuator is supplied with pressure fluid via a high speed hydraulic slip ring unit.

10. The combination set forth in claim 9 wherein said hydraulic actuator is resiliently biased toward the engaged position of said drawbar and collet device.

* * * * *

UNITED STATES PATENT AND TRADEMARK OFFICE
CERTIFICATE OF CORRECTION

PATENT NO. : 4,303,360

DATED : December 1, 1981

INVENTOR(S) : Donald J. Cayen and John T. Janeczko

It is certified that error appears in the above—identified patent and that said Letters Patent is hereby corrected as shown below:

Col. 3, Line 24, before "boss" insert -- guide --;

Col. 4, Line 4, before "boss" insert -- guide --;

Line 20, before "boss" insert -- operating --;

Col. 6, Line 35, delete "annular land" and substitute -- operating boss --;

Line 38, delete "annular land" and substitute -- operating boss --;

Line 41, delete "annular land" and substitute -- operating boss --;

Line 59, delete "annular land" and substitute -- operating boss --;

Line 62, delete "annular land" and substitute -- operating boss --;

Line 65, delete "annular land" and substitute -- operating boss --.

Signed and Sealed this

Twenty-ninth Day of March 1983

[SEAL]

Attest:

GERALD J. MOSSINGHOFF

Attesting Officer   Commissioner of Patents and Trademarks